United States Patent [19]
Rabinkin

[11] Patent Number: 6,165,290
[45] Date of Patent: Dec. 26, 2000

[54] COBALT-CHROMIUM-PALLADIUM-BASED BRAZING ALLOYS

[75] Inventor: Anatol Rabinkin, Morris Plains, N.J.

[73] Assignee: AlliedSignal Inc., Morristown, N.J.

[21] Appl. No.: 09/086,832

[22] Filed: May 29, 1998

[51] Int. Cl.[7] .......................... C22C 19/07; C22C 45/04
[52] U.S. Cl. ........................ 148/403; 148/425; 420/436
[58] Field of Search ................................. 148/304, 403, 148/313, 425; 420/436

[56] References Cited

U.S. PATENT DOCUMENTS

| | | | |
|---|---|---|---|
| 3,028,235 | 4/1962 | Hoppin, III | 75/171 |
| 4,260,666 | 4/1981 | DeCristofaro | 428/668 |
| 4,396,577 | 8/1983 | Smith, Jr. et al. | 420/580 |
| 4,515,868 | 5/1985 | Bose et al. | 428/656 |
| 4,515,869 | 5/1985 | Bose et al. | 428/656 |
| 4,515,870 | 5/1985 | Bose et al. | 428/656 |
| 4,801,072 | 1/1989 | Henschel | 228/245 |
| 5,916,518 | 6/1999 | Chesnes . | |

FOREIGN PATENT DOCUMENTS

| | | | |
|---|---|---|---|
| 0 020 965 | 1/1981 | European Pat. Off. | B23K 35/30 |
| 070 383 | 1/1983 | European Pat. Off. | B23K 35/30 |
| WO 98 45491 | 10/1998 | WIPO | C22C 19/07 |

*Primary Examiner*—George Wyszomierski
*Attorney, Agent, or Firm*—Charlotte H. Copperthite; Aaron Nerenberg

[57] ABSTRACT

This invention relates to brazing metals composed of cobalt-chromium-palladium-based alloys containing transition metals such as cobalt, nickel, tungsten, molybdenum and certain metalloids; and more particularly to multicomponent alloys containing cobalt, chromium, palladium, nickel, tungsten, molybdenum, boron, and silicon, which are especially useful for brazing metals at high temperatures to produce high strength, high oxidation and high temperature and corrosion-resistant brazements. Alloys of the present invention have a composition represented by the formula:

$$Cr_a Ni_b W_c Pd_d Si_e B_f CO_{bal}.$$

(plus incidental impurities), where the subscripts "a", "b", "c", "d", and "f" are in atomic percent and "a" is in the range of about 15 and about 22, "b" is between about 0 and about 20, "c" is in the range of about 1 to about 5, "d" is between about 1 and about 10, "e" is in the range of about 5 and about 12, and "f" is between about 5 to about 12 and "bal" is the balance amount to total 100 percent.

30 Claims, 4 Drawing Sheets

COBALT-CHROMIUM-PALLADIUM-BASED BRAZING ALLOYS

BACKGROUND OF THE INVENTION

1. Field of the Invention

This invention relates to brazing metals composed of cobalt-chromium-palladium-based alloys containing transition metals such as cobalt, nickel, tungsten, molybdenum and certain metalloids; and more particularly to multicomponent alloys containing cobalt, chromium, palladium, nickel, tungsten, molybdenum, boron, and silicon, which are especially useful for brazing metals at high temperatures to produce high strength, high oxidation and high temperature and corrosion-resistant brazements. Alloys of the present invention have a composition represented by the formula:

$$Cr_aNi_bW_cPd_dSi_eB_fCO_{bal}.$$

(plus incidental impurities), where the subscripts "a", "b", "c", "d" "e", and "f" are in atomic percent and "a" is in the range of about 15 and about 22, "b" is between about 0 and about 20, "c" is in the range of about 1 to about 5, "d" is between about 1 and about 10, "e" is in the range of about 5 and about 12, and "f" is between about 5 to about 12 and "bal" is the balance amount to total 100 percent.

2. Description of the Prior Art

Brazing is a process for joining metal parts, often of dissimilar composition, to each other. Typically, brazing is accomplished by interposing a filler metal that has a melting point lower than that of the parts to be joined to form an assembly. The assembly is then heated to a temperature sufficient to melt the brazing filler metal. Upon cooling, a strong, preferably high oxidation and high temperature and high corrosion resistant joint is formed.

A few classes of products produced by brazing processes are used as critical parts of power turbines which are operated, for example as jet engines in the aerospace industry and in stationary power plants to generate electrical energy. Particular power turbine parts, such as turbine seals, first-stage turbine nozzle guide vanes, and turbine blades, are subjected to high temperature highly oxidized environments in operation. Thus, the brazed parts used in these applications must be able to withstand such harsh operating conditions in order to achieve high energy efficiency that directly relates with operating temperature.

An another important application of brazing technology is the manufacture of light-weight high temperature resistant honeycomb structures for leading edges of wings and other body parts of supersonic jets and reusable shuttles. In these applications, the base metals to be joined are mostly nickel- and cobalt-based superalloys and high chromium containing iron-based alloys. Such superalloys and iron-chromium-based alloys have complex compositions comprised of some or all of a group of transition elements such as cobalt, nickel, chromium, iron, and some refractory elements. Additionally, all these alloys also typically contain aluminum, titanium and, sometimes, yttria additions to improve their high temperature and high oxidation resistance. The latter is achieved due to intrinsic formation of oxide alumina/titania surface protecting film on such base metal parts.

Of particular importance for all parts subjected to high temperature service environment is their resistance to oxidation while maintaining the part's mechanical integrity. The oxidation resistance of these base metals is due to existence of the above mentioned dense alumina/titania protecting film on the part surface. Unfortunately, brazing by using filler metals containing active metalloid elements such as boron and silicon, causes a partial or even complete dissolution of these protecting oxide films in the brazed areas. As a result, the brazed interfaces act as conduits for oxygen penetration which can cause catastrophic part oxidation. Therefore, during the brazing of materials it is of paramount importance to preserve the integrity of the braze interfaces even if these oxide films cannot be preserved in the initial state.

Previously, some amorphous brazing filler metals consisting of cobalt/nickel-chromium-based alloys have been developed which exhibit a sufficient strength and good corrosion resistance at elevated temperatures. Such alloys have been disclosed, for example, in U.S. Pat. Nos. 4,260,666, 4,515,868, 4,515,869, 4,515,870, and 4,801,072. The alloys disclosed in these patents, however, each exhibit drawbacks, which make them unsuitable for brazing products that require prolonged service life at high temperature and in highly oxidizing and corrosive environments. For example, the alloys disclosed in U.S. Pat. No. 4,260,666, 4,515,868 and 4,801,072 contain the transition and refractory elements and boron and silicon. Unfortunately, boron due to its very small atomic radius diffuses extensively out of the joint area into alloys, particularly in those containing chromium, because of tendency to form strong chromium borides. These borides are formed preferentially at grain boundaries resulting in alloy brittleness and excessive oxidation or even complete failure. At the same time, these alloys contain no elements which protect the base metal from boron diffusion.

Regarding the multicomponent alloys disclosed in U.S. Pat. Nos. 4,515,869 and 4,515,870, they also contain the similar transition and refractory elements and boron and silicon but are based on nickel. Therefore these multicomponent alloys, contain only a moderate (less than 30 atom per cent) amount of cobalt and as a result are is insufficient to protect brazed parts from high temperature and highly oxidizing environment.

For the above reasons, the alloys previously known are not effective for use in brazed products to be employed in high temperature, high oxidizing and high stress environments existing in turbine engines and supersonic airspace structural applications.

Accordingly, there remains a need in the art for improved brazing filler materials suitable for brazing superalloys and iron-chromium-based alloys at high temperatures that can withstand a service in high temperature and highly oxidizing environments under high stresses for a long time.

Specifically, there has been a need in the art for a brazing filler metal that would form naturally a protecting layer of high temperature resistant phases at the braze interface, protecting base metal parts from excessive boron penetration on completing of brazing. Moreover, it would be even more beneficial if this layer could keep boron inside the joint preventing it from excessive diffusion into the base metal. Thus, it is an object of the present invention to provide such a brazing metal.

It is a further object of the present invention to provide brazing filler metals that first, contain major metallic elements that are compatible with high temperature resistant base metals; second, can wet oxide covered surface during brazing operation; and third, contain an element or elements that predominantly migrate to and form a protecting phase layer at the joint interface.

SUMMARY OF THE INVENTION

The present invention provides an improved brazing filler metal which possesses high temperature melting characteristics and forms brazements that have high strength and high oxidation resistance at very high service temperatures. Brazing alloys particularly suited for use as the filler metal contain cobalt, chromium, palladium, nickel, tungsten, molybdenum, boron, and silicon, which are especially useful for brazing metals at high temperatures to produce high strength, high oxidation and high temperature and corrosion-resistant brazements. Alloys have a composition represented by the formula:

$$Cr_aNi_bW_cPd_dSi_eB_fCO_{bal}.$$

plus incidental impurities, where the subscripts "a", "b", "c", "d", "e", and "f" are in atomic percent and "a" is in the range of about 15 and about 22, "b" is between about 0 and about 20, "c" is in the range of about 1 to about 5, "d" is between about 1 and about 10, "e" is in the range of about 5 and about 12, and "f" is between about 5 to about 12 and "bal" represents the balance of to total 100 percent.

The alloys of the present invention exhibit a number of advantageous properties not recognized nor disclosed heretofore. These alloys exhibit a high melting temperature in the range of about 1050 and about 1180° C. These alloys exhibit virtually negligible diffusion problems associated with boron containing alloys because they contain only low amount of boron and, most importantly, contain palladium. Palladium forms a predominant layer of high melting high oxidation resistant aluminum-palladium AlPd intermetallic phase at joint interfaces thus preventing boron penetration, changing, refining favorably the joint microstructure and protecting joints from oxidation. Further, in spite of the presence of palladium, minimization of boron concentration coupled with maintaining silicon concentration at relatively low levels the alloys of the present invention can be manufactured as a ductile product. More further, increasing the palladium concentration at the expense of the cobalt concentration preserves the ability of the alloy to be formed in the amorphous state and to remain ductile in the foil form.

The brazed base metal parts are protected from oxidation and their high temperature strength is at a high level because the alloys of the present invention exhibit excellent protection from excessive detrimental boron diffusion into the base metal due to formation of a beneficial layer of AlPd phase at joint interfaces. Likewise, because the high temperature solid AlPd phase forms first at the solid base metal/liquid filler metal interface, the erosion of thin base metal stock is substantially restrained due to curtained interaction between liquid filler and solid base metals.

Brazements produced using such filler metal have substantially uniform microstructure and possess high strength at elevated temperatures. In addition, the invention provides brazing filler metals in the form of homogeneous ductile foils which are composed of metastable materials preferably having at least 80% amorphous structure.

Further, in accordance with the present invention, an improved process is provided for joining superalloys and/or iron-chromium-based honeycomb structures, which process comprising the steps of: interposing a filler metal of the above described composition between base metal parts to form an assembly, heating the assembly to a temperature about 25 to 50° C. above the liquidus temperature of the brazing filler metal and holding at this temperature for a time sufficient to form a strong and oxidation resistant joint.

BRIEF DESCRIPTION OF THE DRAWING

This invention will be more fully understood and further advantages will become apparent when reference is made to the following detailed description of the preferred embodiments of the invention and the accompanying drawing, in which.

DETAILED DESCRIPTION OF THE INVENTION

Figure 1:
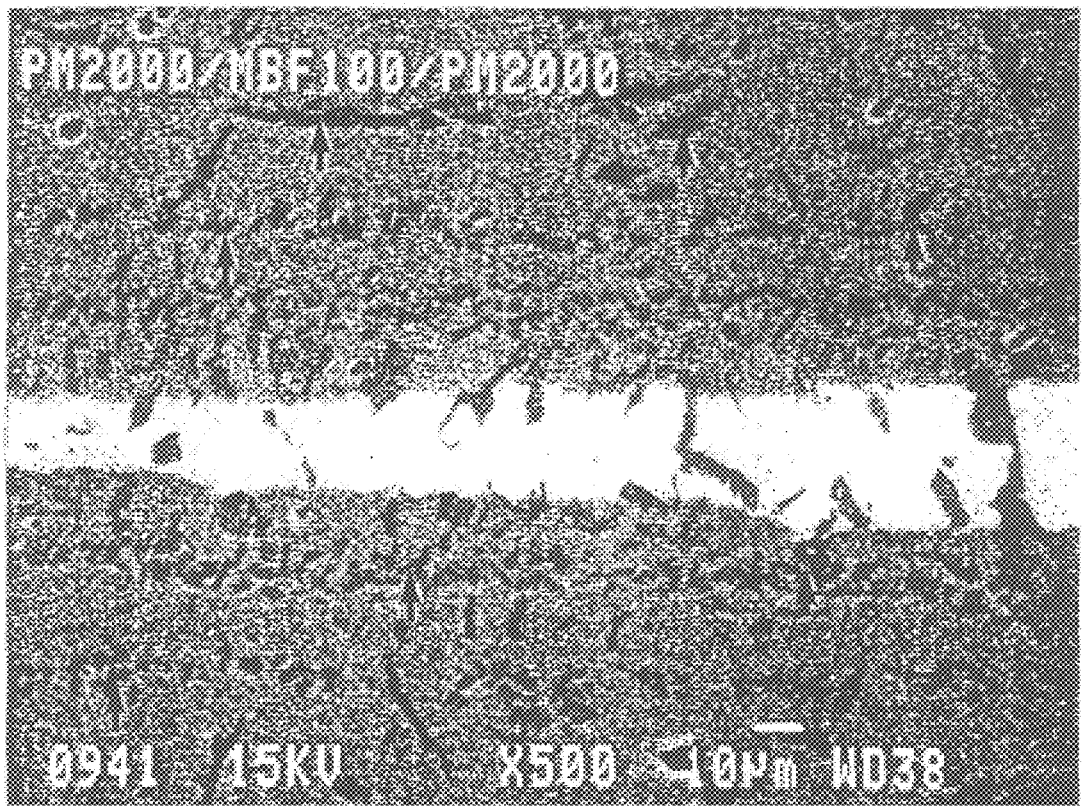
FIG. 1 is an SEM micrograph of a iron-chromium-aluminum-based joint made using a filler metal manufactured according to previous art as depicted in U.S. Pat. No. 4,260,666, the micrograph depicting presence of a substantial amount of chromium borides (at black arrows) precipitated in the body of base metal part. These borides segregate predominantly at planes which are parallel to the direction of rolling of the base metal alloy.

In any brazing process, the brazing material must have a melting point that will be sufficiently high to provide strength to meet service requirements of the metal parts to be brazed together. Further, the material must be compatible, both chemically and metallurgically, with the base metal parts being brazed. Ideally, the brazing material should be in 100% metal containing foil form so that complex shapes may be stamped therefrom and so that brazing of complex structures can be readily accomplished. Moreover, brazing foils should be homogeneous and ductile; that is, contain no binders or other materials that would otherwise form voids or contaminating residues during brazing, and exhibit sufficient flexibility such that the foil can be bent to a round radius as small as about 10 times the foil thickness without fracture.

In accordance with the present invention, multicomponent cobalt/nickel-chromium-based alloys are provided which exhibit a liquidus of at least about 1090 degree(s) C, and are particularly suitable for brazing superalloys and iron-chromium-aluminum-based alloys. The brazing filler metals have a composition represented by the formula:

$$Cr_a Ni_b W_c Pd_d Si_e B_f CO_{bal}.$$

plus incidental impurities, where the subscripts "a", "b", "c", "d", "e", and "f" are in atomic percent and "a" is in the range of about 15 and about 22, "b" is between about 0 and about 20, "c" is in the range of about 1 to about 5, "d" is between about 1 and about 10, "e" is in the range of about 5 and about 12, and "f" is between about 5 to about 12 and "bal" represents the balance amount to total 100 percent.

Boron and silicon are added to enhance the ability of the alloys to exist in the amorphous form and to lower the melting point of the alloys. The additions of boron and silicon also provide wettability and ensure metallurgical bonding between the filler metal and the base. Individually, boron is present in the amount of about 5 to about 12, and more preferably about 6.5 to about 8.0 atom percent, to improve amorphability and interaction between base and filler metals. The silicon content ranges from about 5 to about 12, and more preferably from about 5.0 to about 10.5 atom percent. In these amounts, it is believed that silicon operates to induce formation of the amorphous structure and contributes to brazeability of the filler metal. The total boron and silicon content cannot be so great as to cause excessive erosion of the base metal during brazing or to cause the excessive formation of separate brittle intermetallic compound phases in the brazement. Preferably, the total boron and silicon content of the filler metal ranges from about 14.5 to about 20 atom percent, and more preferably ranges from 14.5 to about 17 atom percent.

Of critical importance is palladium in an amount 1 atom percent to about 10 atom percent and more preferable 1.5 to 7 atom percent to form a protecting layer of high temperature intermetallic aluminum-palladium phase at the interface between the braze and the base metal. According to binary aluminum-palladium constitutional phase diagrams, both these elements form a very high melting ($T_{melt}$=1645° C.) strong and oxidation resistant AlPd intermetallic component which exist in a narrow compositional range. See "Binary Alloy Phases Diagrams" Ed. T. Maisalski, ASM 1990, vol. 1 p. 139–141. This compound, according to the standard thermodynamics data, has a very high value of enthalpy of formation compared with that of any other potential intermetallic and other phases which cobalt, chromium, tungsten, iron, and silicon may form with aluminum. The high value of enthalpy of formation is a basic measure of the intensity of a chemical reaction between elements involved and an indicative of the chemical stability and the mechanical strength of its resulting product substance(s), i.e., AlPd in this particular case. (See Table 1)

TABLE 1

Heats of Formation $\Delta H^0$ for Various Pertinent Aluminides and Chromium Boride

| Phase | $\Delta H^0$, kJ (mole at.)$^{-1}$ |
|---|---|
| CoAl* | −55 |
| Cr$_2$Al* | −11 |
| FeAl$_2$* | −25 |
| NiAl* | −59 |
| WAl$_4$* | −10.4 |
| PdAl* | −92 |
| Pd$_2$Al* | −85 |
| B$_2$Al** | −67 |
| CrB** | −75 |

*B. Pretorius et al., Mat. Sci. Engr., 10 (1993), pages 76–78.
*O. Kubaschewski and C. Alcock, Metallurgical Thermochemistry, Pergamon Press, 1979, page 280.

The data in Table 1 reveals, according to the present invention a reason for the discovery that during brazing operation the AlPd binary intermetallic phase segregates first at the joint interface between multicomponent base and filler metals. It is believed that as a result, formation of a protective phase layer occurs.

In addition, preferably, tungsten is also present in an amount between about 1 and about 5 atom percent, and more preferably in an amount ranging from about 3.0 to about 3.5 atom percent. The role of tungsten in the alloys of the present invention is to preserve the high melting temperature of the alloy while increasing the overall strength of the passive film forming on brazes.

Cobalt and chromium, major elemental components, constitute the compositional base of the alloys of the present invention and they are particularly suited to provide a high temperature oxidation resistance of brazes formed. The presence of nickel in alloys of the present invention greatly improves their resistance to certain non-oxygenating corrosive media. Nickel also imparts other desired properties, such as amorphability, ductility and the like.

The alloys of the present invention can be produced in various forms, such as powders, foils, ribbons and wires by application of various well known techniques. The alloys of the present invention may also be produced in the form of metastable powders, homogeneous, ductile foils or wires by casting alloys of the above described composition using rapid solidification techniques. Methods commonly used to fabricate alloys in powder form include gas or water atomization or mechanical pulverization. The most preferred method used to fabricate alloys of the present invention into foils, ribbons or wire is rapid solidification.

The alloys of the present invention exhibit a number of advantageous properties neither recognized nor disclosed heretofore. These alloys exhibit a high melting temperature and no significant diffusion problems, generally associated with high boron-containing alloys, because boron concentration is kept at a minimum whereas the presence of palladium keeps boron predominantly inside of the braze. At the same time, boron concentration, coupled with sufficient silicon concentration, enables the production of a ductile and thick ribbon product by rapid solidification technology. Moreover, containing combined boron and silicon concentration at sufficient levels and keeping chromium concentration at about 21 atom % threshold preserves the ability of the alloy to be formed in the amorphous state and to remain ductile in the ribbon shape. Finally, the alloys of the present invention do not substantially erode the base metal, thereby preserving the integrity of thin fin parts used in honeycomb and plate-type structures.

The alloys of the present invention may be produced in the form of homogeneous, ductile foils or wires by casting alloys of the above described composition using rapid solidification techniques. More specifically, the homogeneous brazing filler metals of the present invention may be fabricated by a rapid solidification process which comprises forming a melt of the composition, and quenching the melt on a rotating quenching wheel at a rate of at least about $10^5$ degree(s) C per second. Such a process is disclosed in U.S. Pat. No. 4,142,571.

Figure 4:
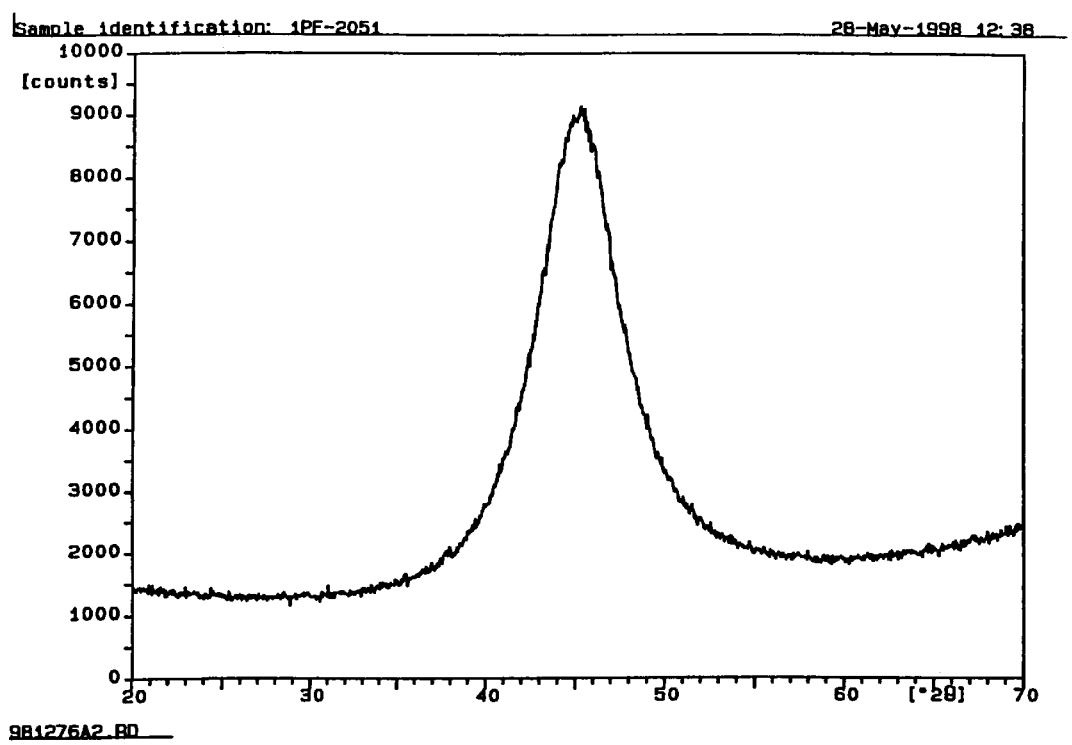
FIG. 4 is an x-ray diffraction patent taken from foil Sample No. 4 which shows a diffused hallo characteristics of amorphous state.

Under these quenching conditions, a metastable, homogeneous ductile product is obtained. The metastable material may be amorphous, in which case there is no long range order as evidenced by X-ray diffraction patterns which show a diffuse halo, similar to that observed for inorganic oxide glasses (FIG. 4). Preferably, the microstructure of alloys of the present invention contained at least 50% of amorphous phase to achieve superior ductility, and most preferably it is at least about 90% amorphous.

Metastable products may also be a solution of constituent elements. In the case of the alloys of the present invention, such metastable, solid solution phases are not ordinarily produced under conventional processing techniques employed in the art of fabricating crystalline alloys. Accordingly, the above-described casting processes are employed. These metastable products may be rapidly solidified powders or foils which are also ductile.

Foils produced by the rapid solidification process described herein are between about 13 and about 100 micrometers thick, ordinarily between about 13 and about 76 micrometers thick and up to 200 mm wide and more. Because these products are homogeneous (i.e., of substantially uniform composition in all directions), brazements produced therefrom are quite uniform and substantially free of voids.

Within the broad range of the compositions of the present invention, a preferred embodiment has been discovered having a composition of about 18 atom percent to about 22 atom percent chromium, 12 to about 17 atom percent nickel, about 1.5 to about 7 atom percent palladium, about 3.0 to about 3.5 atom percent tungsten, about 5 to about 10.5 atom percent silicon, and about 6.5 to about 8.0 atom percent boron, the balance being essentially cobalt and incidental impurities. The alloys within this most preferred embodiment exhibit a melting temperature range of between about 1010 (Solidus, $T_S$) degree(s) C and about 1180 degree(s) C (liquidus, $T_L$) and, most preferably, range from about $T_S$ 1015 degree(s) C to about 1160 $T_L$ degree(s) C. The specific advantages of these alloys include the ability to braze at high temperatures and to provide a brazement which can be employed at elevated temperature under high oxidation and corrosive environment without any significant degradation of mechanical properties.

Alloys produced in accordance with the invention are particularly suited for the brazing of turbine parts and air and space craft structures used in aircraft industries and power plant.

The following examples are presented to provide a more complete understanding of the invention. The specific techniques, conditions, materials, proportions and reported data set forth to illustrate the principles and practice of the invention are exemplary and should not be construed as limiting the scope of the invention.

EXAMPLE 1

Ribbons about 2.54 to about 200 mm (about 0.1 to about 8 inches) wide and about 13 to about 76 micrometers (about 0.0005 to about 0.003 inch) thick are formed by continually depositing a melt of each of the compositions set forth in Table 2 below, by overpressure of argon onto a rapidly rotating copper chill wheel (surface speed about 3000 to about 6000 ft/min). Metastable homogeneous ribbons having substantially glassy structure are produced. The liquidus and solidus temperatures of the ribbons described in Table 2 are determined by the Differential Thermal Analysis (DTA) technique. The individual samples are heated side by side with an inert reference material at a uniform rate, and the temperature difference between them is measured as a function of temperature. A thermogram is produced (a plot of heat-energy change vs. temperature) from which the beginning of melting and the end of melting, known respectively as solidus and liquidus temperatures, is determined. The values are reported in Table 2 below.

TABLE 2

NOMINAL (WEIGHT %) ALLOY COMPOSITION AND MELTING CHARACTERISTICS

| Alloy No. (Laboratory Designation) | Composition, wt % | | | | | | | Melting Characteristics | |
|---|---|---|---|---|---|---|---|---|---|
| | Co | Cr | Ni | Pd | W | B | Si | Solidus, °C. | Liquidus, °C. |
| 1 (MBF-100) | Bal. | 21.25 | — | — | 1.2 | 11.65 | 3.05 | 1130 | 1160 |
| | | 21.0 | | | 4.50 | 2.40 | 1.60 | | |
| 2 (#5) | Bal. | 22.17 | — | 1.58 | 1.27 | 7.26 | 12.4 | 1056 | 1136 |
| | | 20.5 | | 3.00 | 4.15 | 1.40 | 6.20 | | |
| 3 (1PF-2050) | Bal. | 21.33 | — | 1.49 | 1.29 | 7.81 | 10.34 | 1056 | 1131 |
| | | 21.0 | | 3.00 | 4.50 | 1.60 | 5.50 | | |

TABLE 2-continued

NOMINAL (WEIGHT %) ALLOY COMPOSITION AND MELTING CHARACTERISTICS

| Alloy No. (Laboratory Designation) | Composition, wt % | | | | | | | Melting Characteristics | |
|---|---|---|---|---|---|---|---|---|---|
| | Co | Cr | Ni | Pd | W | B | Sl | Solidus, ° C. | Liquidus, ° C. |
| 4 (1PF-2051) | Bal. | 20.55 | 13.65 | 1.50 | 1.31 | 7.9 | 8.37 | 1068 | 1156 |
| | | 20.0 | 15.00 | 3.00 | 4.50 | 1.60 | 4.40 | | |
| 5 (1PF-2052) | Bal. | 20.72 | 13.76 | 2.53 | 1.32 | 7.97 | 8.44 | 1018 | 1152 |
| | | 20.00 | 15.00 | 5.00 | 4.50 | 1.60 | 4.40 | | |

EXAMPLE 2

Specimens for metallographic tests are dimensioned and fabricated as "sandwich-like" lap type specimens. Each specimen is comprised of two 125 μm thick strips of alloy PM2000, having a composition 20 wt. % Cr, 5.5% Al, 0.5% Ti, 0.45% $Y_2O_3$, and the balance being iron, and a single 25 μm thick foil of one of the samples presented in Table 2. The foils include Sample No. I manufactured according to previous art and samples of nominal composition of Nos. 4 and 5 manufactured according to the present invention. The single brazing foil is preplaced between two PM2000 strips. The width of the PM2000 strips and all brazing filler metal alloys is about 10 mm. In the case of these brazing alloys, the ribbons act as spacers. Brazing is done in a vacuum furnace which is evacuated to a pressure of equal or lower than $1.33 \times 10^{-2}$ Pa ($10^{-4}$ Torr). The brazing is carried out at 195° C. for 15 min. Upon cooling in the furnace, segments are cut from brazed specimens, mounted in plastic form, and polished on standard equipment to accomplish preparation of metallographic specimens for scanning electron microscopy metallographic observations. Joint microstructure is observed using SEM/EDAX and Auger analytical methods. The typical microstructure of a joint prepared using alloy with nominal composition of Sample 1 which is manufactured using previous art shown in FIG. 1. The micrograph depicts presence of a substantial amount of chromium borides precipitated in the body of base metal part. These borides (at black arrows) segregate predominantly at planes, which are parallel to the direction of rolling of the base metal alloy.

Figure 2:
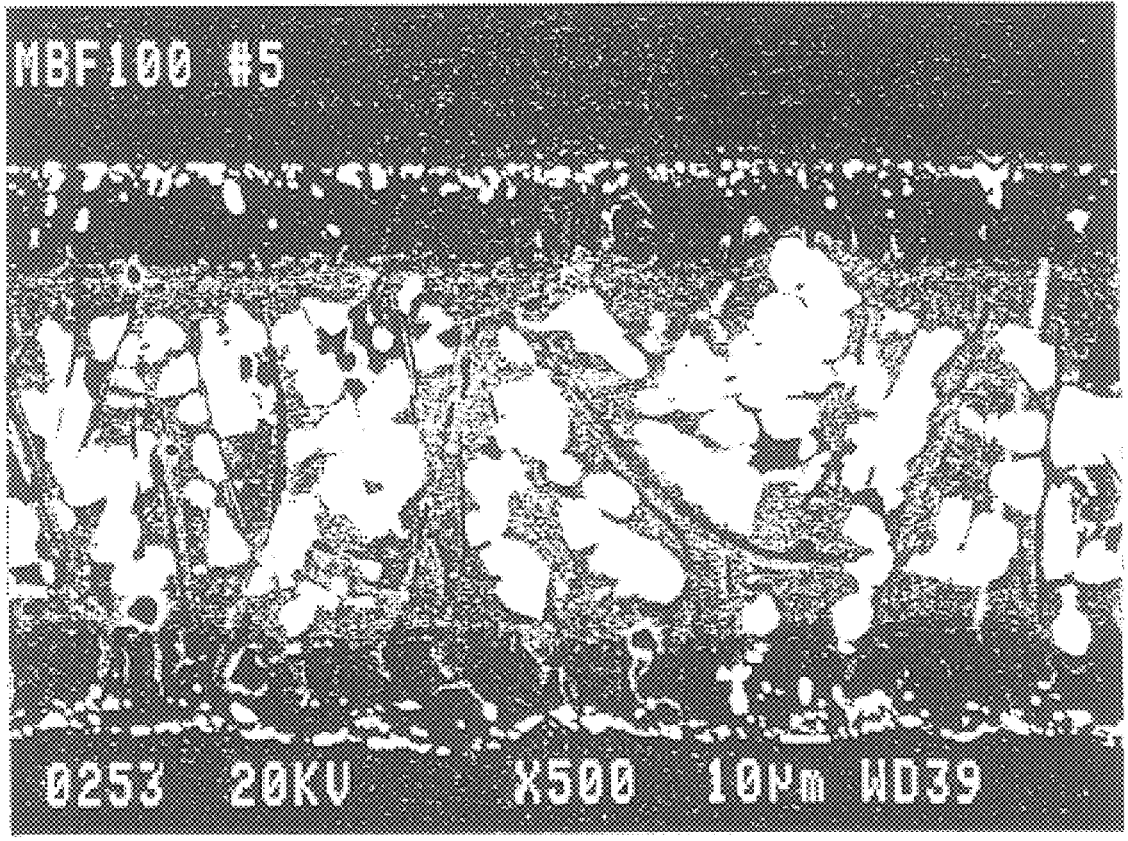
FIG. 2 is an SEM micrograph of an iron-chromium-aluminum-based joint made using a filler metal which contains 3 wt. % palladium and was manufactured according to the present invention, the micrograph depicting a dense layer of AlPd intermetallic phase formed at the joint interface (at empty arrows) and protecting base metal from boron penetration and formation of detrimental chromium borides. The base metal has a substantially uniform, single phase microstructure with a very limited amount of precipitated chromium borides.
Figure 3:
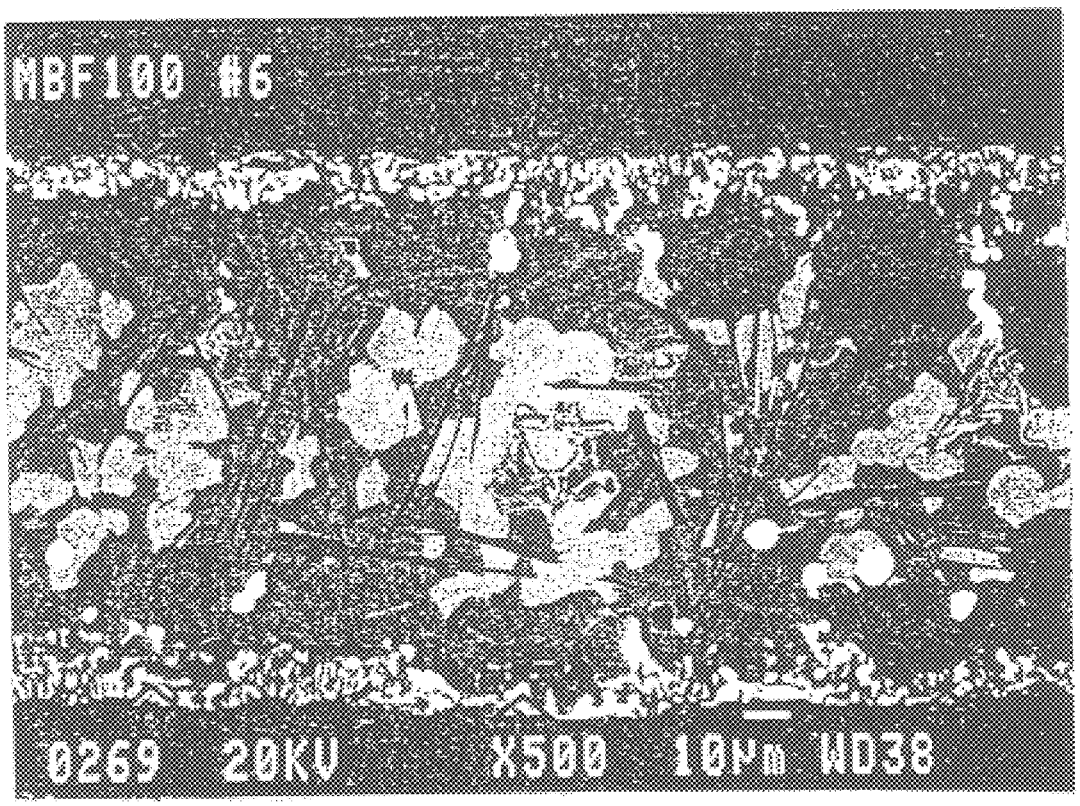
FIG. 3 is an SEM micrograph of an iron-chromium-aluminum-based joint made using a filler metal which contains 5 wt. % palladium and was manufactured according to the present invention, the micrograph depicting the same beneficial basic features of the joint microstructure as that shown in FIG. 2 but containing a substantially larger amount of the AlPd phase (at empty arrows). This demonstrates that formation of AlPd phase is indeed related to the amount of palladium in the filler metal alloy of the present invention.

FIG. 2 is an SEM micrograph of a specimen prepared using a filler metal foil with a nominal composition Sample No. 4 which contains 3 wt. % palladium and is manufactured according to the present invention, the micrograph depicting a dense layer of AlPd intermetallic phase (at empty arrows) formed at the joint interface and protecting base metal, from boron penetration and formation of detrimental chromium borides. The base metal has a substantially uniform, single-phase microstructure with a very limited amount of precipitated chromium borides. FIG. 3 is a micrograph of joint made using a filler metal foil with a nominal composition Sample 6 No. 5 which contains 5 wt. % palladium and is manufactured according to the present invention, the micrograph depicting the same beneficial basic features of the joint microstructure as that shown in FIG. 2 but containing a substantially larger amount of the AlPd phase (at empty arrows). This demonstrates that formation of AlPd phase is indeed related to the amount of palladium in the filler metal alloy of the present invention.

Having thus described the invention in rather full detail, it will be understood that such detail need not be strictly adhered to but that various changes and modifications may suggest themselves to one skilled in the art, all falling within the scope of the present invention as defined by the subjoined claims.

What is claimed is:

1. A brazing material comprising a composition defined by the formula:

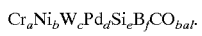

$Cr_aNi_bW_cPd_dSi_eB_fCO_{bal}$.

plus incidental impurities, where the subscripts "a", "b", "c", "d", "e", and "f" are in atomic percent and "a" is in the range of about 15 and about 22, "b" is between about 0 and about 20, "c" is in the range of about 1 to about 5, "d" is between about 1 and about 10, "e" is in the range of about 5 and about 12, "f" is between about 5 to about 12 and "bal" is the balance amount to total 100 percent.

2. The brazing material as recited in claim 1 wherein the material is a powder.

3. The brazing material as recited in claim 1 wherein the material is an alloy.

4. The alloy as recited in claim 3 wherein the alloy is at least about 50% glassy.

5. A brazing foil formed from the alloy of claim 4.

6. The alloy as recited in claim 3 wherein the alloy is at least about 80% glassy.

7. A brazing foil formed from the allow of claim 5.

8. A brazing foil formed from the alloy of claim 3.

9. A brazing material, as recited by claim 1, having a solidus of at least about 1010 degree(s) C and a liquidus ranging from at least about 1160 degree(s) C to about 1180 degree(s) C.

10. A brazing material as recited in claim 9, wherein the material is a foil having a thickness ranging from about 13 μm to 100 μm.

11. A brazing material as recited in claim 9, wherein the material is a foil and "a" ranges from about 18 to about 22 atom percent.

12. A brazing material as recited in claim 9, wherein the material is a foil and "b" ranges from about 12 to about 17 atom percent.

13. A brazing material as recited in claim 9, wherein the material is a foil and "c" ranges from about 3.0 to about 3.5 atom percent.

14. A brazing material as recited in claim 9, wherein the material is a foil and "d" ranges from about 1.5 to about 7 atom percent.

15. A brazing material as recited in claim 9, wherein the material is a foil and "e" ranges from about 5 to about 10.5 atom percent.

16. A brazing material as recited in claim 9, wherein the material is a foil and "f" ranges from about 6.5 to about 8.0 atom percent.

17. The brazing material as recited in claim 1 wherein the material is a foil.

18. The brazing material of claim 1 having a melting temperature range from about 1010 degrees C to about 1180 degrees C.

19. A brazing material comprising a composition defined by the formula:

$$Cr_a Ni_b W_c Pd_d Si_e B_f CO_{bal}.$$

plus incidental impurities, where the subscripts "a", "b", "c", "d", "e", and "f" are in atomic percent and "a" is in the range of about 18 and about 22, "b" is between about 12 and about 17, "c" is in the range of about 3.0 to about 3.5, "d" is between about 1.5 and about 7, "e" is in the range of about 5 and about 10.5, "f" is between about 6.5 to about 8 and "bal" is the balance amount to total 100 percent.

20. The brazing material as recited in claim 18 wherein the material is a powder.

21. The alloy as recited in claim 20 wherein the alloy is at least about 50% glassy.

22. A brazing foil formed from the alloy of claim 21.

23. The brazing material as recited in claim 19, wherein the material is an alloy.

24. The alloy as recited in claim 23 wherein the alloy is at least about 80% glassy.

25. A brazing foil formed from the alloy of claim 24.

26. A brazing alloy as recited in claim 24, wherein the alloy is a foil having a thickness ranging from about 13 μm to 100 μm.

27. A brazing foil formed from the alloy of claim 23.

28. A brazing material, as recited by claim 19, having a solidus of at least about 1010 degree(s) C and a liquidus ranging from at least about 1130 degree(s) C to about 1180 degree(s) C.

29. The brazing material as recited in claim 19 wherein the material is a foil.

30. The brazing material of claim 19 having a melting temperature range from about 1080 degrees C to about 1150 degrees C.

* * * * *